Feb. 10, 1959  C. M. TERRY  2,872,939
FLOW CONTROL VALVE
Filed Dec. 10, 1954

Inventor:
Charles M. Terry
By: Schrader, Hofgren,
Brady & Wegner
Attorneys

United States Patent Office 2,872,939
Patented Feb. 10, 1959

2,872,939

FLOW CONTROL VALVE

Charles M. Terry, Decatur, Ill., assignor to A. W. Cash Valve Manufacturing Corporation, a corporation of Illinois Application December 10, 1954, Serial No. 474,444

4 Claims. (Cl. 137—504)

This invention relates to a flow control valve, and, more particularly, to an improved flow control valve adapted for use in connection with fluid dispensing systems.

The primary object of this invention is to provide an improved flow control valve.

A further object of this invention is to provide a simple and reliable flow control valve in which a more nearly perfect pressure balance is maintained so as to permit only the slightest variation in the predetermined rate of flow.

Still another object of the invention is to provide an improved flow control valve having a slidable member for maintaining a predetermined rate of liquid flow with only the slightest variation wherein the member has an orifice and a more nearly perfect pressure balance is maintained between the pressures acting on the member at opposite sides of the orifice.

The invention is illustrated in a preferred embodiment in the accompanying drawing, in which—

Figure 1:
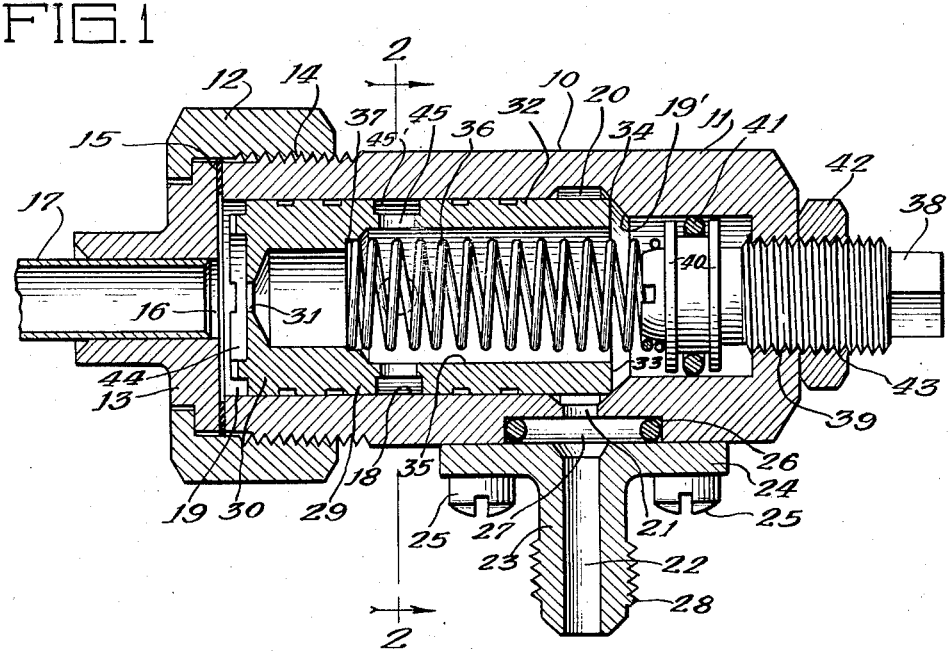
Figure 2:
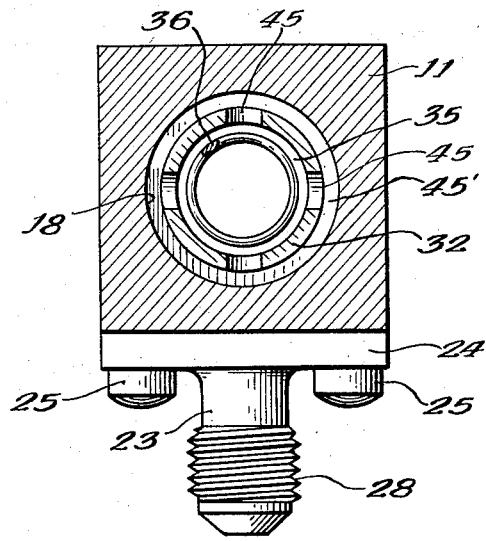

Fig. 1 is a longitudinal sectional view of a flow control valve embodying the invention; and Fig. 2 is a vertical section taken along the line 2—2 of Fig. 1.

In the embodiment illustrated, a flow control valve 10 has a housing formed by a generally rectangular casing 11, a coupling 12 and an inlet adapter 13. The coupling member 12 makes a threaded connection with the casing 11, as indicated at 14, and confines therebetween the inlet adapter 13 and a gasket 15. A fluid inlet port 16 which may receive an inlet pipe 17 is provided in the adapter 13.

The casing 11 of the flow control valve housing has a cylindrical wall 18 forming a longitudinal chamber 19. The portion of the wall 18 opposite the fluid inlet port 16 is tapered inwardly in a direction away from the inlet port 16 to form an annular bevelled seat 19'. An annular groove 20 is formed in the wall 18 adjacent the bevelled seat 19' and one side of the groove may be formed by a portion of the bevelled seat 19'.

The annular groove 20 has a fluid outlet port 21 communicating therewith and opening to a discharge passage 22 formed in an outlet member 23 having a flange 24 which may be attached to the casing 11 of the housing by members such as threaded bolts 25. The casing may be recessed at 26 to form a seat for an O-ring 27 which forms a seal between the flange 24 and the casing 11. A fluid conduit (not shown) may be attached to the outlet member 23 by means of the threads 28 provided on said member.

A cylindrical hollow piston member 29 is slidably mounted in the chamber formed by the cylindrical wall 18. The piston member 29 has a perforate end wall 30 provided with a measuring orifice 31, and the end of the piston member opposite to the end wall 30 is in the form of an annular skirt 32 which forms an annular valve member which may engage the bevelled seat 19'. An end face 33 of the skirt is substantially flat and has an outer peripheral edge 34. The annular bevelled seat 19' is at an angle with respect to the end face 33, which may be approximately 45°, so that the outer peripheral edge 34 makes line contact with the bevelled seat 19'.

The hollow interior 35 of the piston member 29 receives a spring 36 which has one end in engagement with a shoulder 37 formed on the interior of the piston member and has its other end in engagement with a pressure-adjusting screw 38 which is adjustably mounted in an end of the casing 11 by a threaded connection indicated at 39. A pair of flanges 40 may be provided on the inner end of the adjusting screw to confine an O-ring 41 therebetween to effect a fluid seal. A lock nut 42 may be threadably connected to the adjusting screw 38, as indicated at 43, to hold the screw in adjusted position.

The end wall 30 of the piston member is provided with a notched ring 44 to prevent contact between the end wall 30 and the housing inlet adapter 13.

The piston member is radially perforated by a plurality of radial openings or passages 45 which connect the interior of the piston member with an annular groove, defined by side walls 45', and the surrounding area of the chamber 19.

*Operation*

The flow control valve may be used in a beverage dispenser whereby fluid under pressure will enter the valve and the outlet side of the valve connects with an on-off dispensing valve. When the dispensing valve is opened the flow control valve becomes operative to ensure a certain amount of fluid flowing for a unit of time.

The spring 36 is set by adjusting screw 38 to determine the desired pressure differential to be maintained between the pressure existing on opposite sides of the orifice 31; namely, that existing in the fluid inlet port 16 and that existing in the interior 35 of the piston member, respectively. When the valve is operating with the fluid entering the inlet port at a constant pressure, the end face 33 of the piston member will be positioned away from the bevelled seat 19' to permit a constant rate of flow of fluid through the orifice 31 to pass out the outlet port 21. If the pressure of fluid in the inlet port 16 should increase, this acts upon the end wall 30 of the piston member to shift the piston member and the annular valve member part thereof toward the bevelled seat 19' so as to restrict flow from the interior of the piston member to the fluid outlet until pressure builds up sufficiently within the interior of the piston member to restore the predetermined differential pressure.

With the disclosed construction, the pressure within the interior of the piston member is always operative on a predetermined area since the edge 34 of the end face 33 of the piston member makes line contact with the bevelled seat. This aids in creating a more nearly perfect pressure balance. Furthermore, the edge of the end face of the valve member forms with the beveled seat an annular venturi passage. There is a progressive drop in pressure in the convergent inlet side of the passage ending at the throat of the passage. The disclosed construction causes the diameter of the venturi passage throat to increase and move radially beyond the outer edge 34 of the valve member as the valve member opens so that the low pressure zone occurring on the inlet side of the passage and reaching a minimum at the passage throat is effective over a smaller area of the piston member.

The radial openings 45 subject the primary leakage around the end wall 30 of the piston member to the pressure within the interior of the piston member so that the rate of leakage flow will be constant as is the rate of flow through the orifice 31. The secondary leakage past the skirt portion 32 of the piston member to the outlet 21 will be compensated for by movement of the piston member to insure a constant rate of flow from the flow control valve since secondary leakage fluid can only be fluid coming through the piston member orifice 31 or from primary leakage both of which are subjected to the control pressure differential.

The foregoing detailed description is given for clearness of understanding only, and no unnecessary limitations should be understood therefrom, for some modifications will be obvious to those skilled in the art.

I claim:

1. A flow control valve comprising: a housing having a longitudinal chamber formed by a cylindrical wall and two end walls; a fluid inlet port in the housing adapted to direct fluid under pressure through one end wall into said chamber; the opposite end wall of said chamber being tapered inwardly in a direction away from the inlet port to form an annular bevelled seat facing said inlet port; an annular groove in the cylindrical wall of the chamber having one side thereof formed by the outermost portion of the bevelled seat; a fluid outlet port in said housing communicating with said annular groove; a hollow cylindrical member slidably mounted in said chamber and having a perforate end wall adjacent the inlet port, the opposite end of said cylindrical member having an end wall extending laterally across the cylindrical member, said end wall having an outer annular edge forming an annular valve member of the same outer diameter as the cylindrical member to close with line contact against the bevelled seat with the outermost portion of the bevelled seat lying outwardly of the valve member; and a spring for urging said cylindrical member to open position.

2. A device as specified in claim 1, in which the hollow cylindrical member is radially perforate to subject fluid from the inlet port leaking around said hollow cylindrical member to fluid pressure within the member.

3. A device as specified in claim 1, in which the bevelled seat is at an angle of approximately 45° with respect to the plane of the annular valve member end whereby the diameter of the venturi-type passage throat between the seat and said valve member increases as said valve member opens.

4. A flow control valve comprising: a housing having a cylindrical wall forming a chamber and two end walls; a fluid inlet port communicating through one end wall with one end of said chamber; the other end wall being shaped to form an annular bevelled valve seat facing said inlet port; an annular groove in the cylindrical wall formed adjacent the bevelled seat; a fluid outlet port communicating with the annular groove; a hollow cylindrical piston member having a perforate end wall adjacent the inlet port, said piston member having an end face on its end opposite said perforate end wall, shaped to have its outer edge make line contact with the bevelled seat, said face making an angle of about 45° with said seat so that diminished pressure due to flow between the seat and valve member occurs primarily outwardly beyond the piston member and the area of the piston member exposed to fluid pressure does not vary substantially when the piston member engages said seat, said piston member being slidably mounted in said chamber and responsive to variations in the pressure of fluid on the fluid inlet side of the perforate end wall to control the pressure of fluid within the piston member by positioning said end face relative to said bevelled seat, said piston member having an external diameter less than the maximum diameter of the bevelled seat; and a spring for urging the piston member toward said inlet port.

References Cited in the file of this patent

UNITED STATES PATENTS

| 998,695 | Kieser | July 25, 1911 |
| 2,198,487 | Sisk | Apr. 23, 1940 |
| 2,411,392 | Saville | Nov. 19, 1946 |

FOREIGN PATENTS

| 613,117 | Great Britain | Nov. 23, 1948 |